US009743304B2

United States Patent
Tong et al.

(10) Patent No.: US 9,743,304 B2
(45) Date of Patent: Aug. 22, 2017

(54) METHOD OF FEEDING BACK MU-CQI IN A COMMUNICATION SYSTEM, TRANSMISSION POINT DEVICE, AND USER EQUIPMENT

(75) Inventors: Hui Tong, Beijing (CN); Ming Xu, Beijing (CN); Masayuki Hoshino, Kanagawa (JP); Daichi Imamura, Beijing (CN)

(73) Assignee: Sun Patent Trust, New York, NY (US)

( * ) Notice: Subject to any disclaimer, the term of this patent is extended or adjusted under 35 U.S.C. 154(b) by 215 days.

(21) Appl. No.: 13/981,589

(22) PCT Filed: Mar. 31, 2011

(86) PCT No.: PCT/CN2011/072332
§ 371 (c)(1),
(2), (4) Date: Jul. 24, 2013

(87) PCT Pub. No.: WO2012/129803
PCT Pub. Date: Oct. 4, 2012

(65) Prior Publication Data
US 2013/0308488 A1    Nov. 21, 2013

(51) Int. Cl.
*H04W 24/10* (2009.01)
*H04B 7/0452* (2017.01)
(Continued)

(52) U.S. Cl.
CPC .......... *H04W 24/10* (2013.01); *H04B 7/0452* (2013.01); *H04B 7/0632* (2013.01);
(Continued)

(58) Field of Classification Search
CPC .. H04B 7/0452; H04B 7/0632; H04B 7/0639; H04L 1/0026; H04L 1/0031; H04W 24/10
(Continued)

(56) References Cited

U.S. PATENT DOCUMENTS

| | | | |
|---|---|---|---|
| 8,983,389 B2 * | 3/2015 | Bhattad | H04B 7/0452 455/63.1 |
| 2008/0227495 A1 | 9/2008 | Kotecha et al. | |

(Continued)

FOREIGN PATENT DOCUMENTS

| | | | | |
|---|---|---|---|---|
| CN | 101630967 A | | 1/2010 | |
| CN | 101997655 A | | 3/2011 | |
| KR | 20110030372 A | * | 3/2011 | .......... H04B 7/0417 |
| WO | WO 2010032385 A1 | * | 3/2010 | .............. H04B 7/04 |
| WO | 2011/017988 A1 | | 2/2011 | |

OTHER PUBLICATIONS

Qualcomm Europe, "Downlink MIMO transmission modes", Nov. 9-13, 3GPP TSG-RAN WG1 #59, R1-094872, pages: all.*
(Continued)

*Primary Examiner* — Jeffrey M Rutkowski
*Assistant Examiner* — Shah Rahman
(74) *Attorney, Agent, or Firm* — Seed IP Law Group LLP

(57) ABSTRACT

There are provided a method, user equipment, and transmission point device for feeding back channel quality indicator (MU-CQI) to the transmission point in a communication system including the transmission point and a plurality of user equipments, the method comprising steps: the transmission point sending a message to an intended user equipment of the plurality of user equipments; and the intended user equipment calculating the MU-CQI based on the message, and feeding back the MU-CQI to the transmission point. The present disclosure enables dynamic MU operation, and improves link adaptation performance with marginal downlink overhead. And the accuracy is not limited by codebook size.

12 Claims, 4 Drawing Sheets

(51) Int. Cl.
*H04B 7/06* (2006.01)
*H04W 52/02* (2009.01)
*H04L 1/00* (2006.01)

(52) U.S. Cl.
CPC ......... *H04B 7/0639* (2013.01); *H04L 1/0031* (2013.01); *H04L 1/0026* (2013.01); *H04W 52/0238* (2013.01)

(58) Field of Classification Search
USPC .................................................. 370/201, 252
See application file for complete search history.

(56) References Cited

U.S. PATENT DOCUMENTS

| | | | |
|---|---|---|---|
| 2009/0168718 A1 | 7/2009 | Wang et al. | |
| 2010/0173660 A1* | 7/2010 | Liu ........................ | H04W 24/02 455/501 |
| 2010/0238824 A1* | 9/2010 | Farajidana et al. ........... | 370/252 |
| 2010/0285810 A1* | 11/2010 | Ko .......................... | H04B 7/024 455/450 |
| 2010/0309861 A1* | 12/2010 | Gorokhov ............ | H04B 1/7103 370/329 |
| 2010/0309876 A1* | 12/2010 | Khandekar ........... | H04L 5/0037 370/330 |
| 2010/0322176 A1* | 12/2010 | Chen et al. .................... | 370/329 |
| 2011/0051749 A1 | 3/2011 | Cheng et al. | |
| 2011/0170427 A1* | 7/2011 | Koivisto ................ | H04B 7/022 370/252 |
| 2011/0194632 A1* | 8/2011 | Clerckx ................. | H04B 7/024 375/260 |
| 2011/0199986 A1* | 8/2011 | Fong ..................... | H04L 5/0035 370/329 |
| 2011/0217985 A1* | 9/2011 | Gorokhov ............. | H04W 24/10 455/452.2 |
| 2011/0319027 A1* | 12/2011 | Sayana ................. | H04B 7/0632 455/67.11 |
| 2012/0021688 A1* | 1/2012 | Bhattad ................. | H04B 7/0452 455/63.1 |
| 2012/0155414 A1* | 6/2012 | Noh et al. ...................... | 370/329 |
| 2012/0213169 A1 | 8/2012 | Wang et al. | |
| 2012/0213261 A1* | 8/2012 | Sayana et al. ................. | 375/224 |
| 2012/0218968 A1* | 8/2012 | Kim ....................... | H04B 7/024 370/329 |

OTHER PUBLICATIONS

Qualcomm Europe, "Feedback in support of Downlink CoMP: General views", Oct. 2009, 3GPP TSG-RAN WG1 #58bis, R1-094217, Pages: all.*

Alcatel-Lucent, "Comparison of CSI Feedback Schemes," R1-093343, 3GPP TSG-RAN WG1 #58, Agenda Item: 15.2, Shenzhen, China, Aug. 24-28, 2009, 11 pages.
Motorola, "CQI Enhancements for Release-10," R1-105616, 3GPP TSG RAN1 #62bis, Agenda Item: 6.3.2.1, Xian, China, Oct. 11-15, 2010, 6 pages.
Research in Motion, UK Limited, "On Downlink Single Cell MU-MIMO in LTE-A," R1-094458, 3GPP TSG RAN WG1 Meeting #59, Agenda Item 7.5.1, Jeju, Korea, Nov. 9-13, 2009, 8 pages.
Research in Motion, UK Limited, "On Downlink Single Cell MU-MIMO in LTE-A," R1-100562, 3GPP TSG RAN WG1 Meeting #59bis, Agenda Item: 7.2.3, Valencia, Spain, Jan. 18-22, 2010, 7 pages.
Research in Motion, UK Limited, "Signaling of DM-RS Port for LTE-A MIMO Transmission" R1-094111, 3GPP TSG RAN WG1 Meeting #58bis, Agenda Item: 7.4, Miyazaki, Japan, Oct. 12-16, 2009, 9 pages.
ZTE, "Discussion on CQI enhancement for Rel-10 MU-MIMO," R1-105450, 3GPP TSG RAN WG1 Meeting #62bis, Agenda Item: 6.3.2.1, Xi'an, China, Oct. 11-15, 2010, 6 pages.
International Search Report dated Jan. 5, 2012, for corresponding International Application No. PCT/CN2011/072332, 3 pages.
Motorola, "Further Considerations for Supporting Dual-layer Beamforming in LTE Rel-9," R1-093954, 3GPP TSG RAN WG1 #58bis, Agenda Item 6.4.4, Miyazaki, Japan, Oct. 12-16, 2009, 15 pages.
Motorola, "MU-CQI Discussion for Release-10," R1-106286, 3GPP TSG RAN1 #63, Agenda Item: 6.3.2.2, Jacksonville, FL, USA, Nov. 15-19, 2010, 7 pages.
Pantech, "DMRS Indicator of DL signalling for Non-transparent MU-MIMO," R1-103614, 3GPP TSG-RAN WG1 #61bis, Agenda Item: 6.3.3.1, Dresden, Germany, Jun. 28-Jul. 2, 2010, 4 pages.
Qualcomm Incorporated, "Transparent vs. non-transparent MU-MIMO operation," R1-102758, 3GPP TSG-RAN WG1 #61, Agenda Item: 6.3.3.1, Montreal, Canada, May 10-14, 2010, 7 pages.
Partial Supplementary European Search Report dated Nov. 14, 2014, for corresponding EP Application No. 11862368.5-1852 / 2692070, 8 pages.
Extended European Search Report dated Apr. 22, 2015, for corresponding EP Application No. 11862368.5-1852 / 2692070, 14 pages.
Huawei, "Consideration on CSI-RS design for CoMP and text proposal to 36.814," R1-092364, 3GPP TSG RAN WG1#57bis, Agenda Item: 15.1, Los Angeles, USA, Jun. 29-Jul. 3, 2009, 9 pages.
LG Electronics, "Details of eICIC in Macro-Pico case," R1-105352, 3GPP TSG RAN WG1 Meeting #62bis, Agenda Item: 6.8.1.1, Xian, China, Oct. 11-15, 2010, 4 pages.
Qualcomm Incorporated, "Measurements and feedback extensions for improved operations in HetNets," R1-102776, 3GPP TSG-RAN WG1 #61, Agenda Item: 6.8, May 10-14, 2010, Montreal, Canada, 3 pages.

* cited by examiner

METHOD OF FEEDING BACK MU-CQI IN A COMMUNICATION SYSTEM, TRANSMISSION POINT DEVICE, AND USER EQUIPMENT

TECHNICAL FIELD

The present disclosure relates to technical fields of MIMO/Beamforming, multi-user communication, and information feedback.

BACKGROUND ART

MU-MIMO (Multiple User-Multiple Input Multiple Output)) is an important means to increase peak data rate and spectral efficiency in current wireless communications. In general, it is possible to support MU-MIMO operation with SU-MIMO (Single User-MIMO).

FIG. 1 shows a scenario that a transmission point updates CQI (Channel Quality Indicator) and PMI (Precoding Matrix Index) of SU-MIMO for MU-MIMO operation.

As shown in FIG. 1, two user equipments (UEs) may report two sets of SU PMI/CQI, respectively. For example, UE1 reports SU PMI1/CQI1 to the transmission point, and UE2 reports SU PMI2/CQI2 to the transmission point. After receiving the SU PMIs and CQIs, the transmission point will update the SU PMI1/CQI1 and SU PMI2/CQI2 internally to have the PMIs and CQIs feasible for MU transmission, and send data by PDSCH (Physical Downlink Shared Channel) using MU PMI1/CQI1 and MU PMI2/CQI2 to the UE1 and UE2 respectively, as shown in FIG. 1.

However, such update at the transmission point is not accurate. For example, the CQI respectively associated with each UE may be degraded for the MU transmission, compared with SU transmission. The degradation is different for different user equipment implementations. For example, some user equipments may have advanced interference rejection capability, and their CQI degradation can be marginal. For some other user equipments that have less advanced features, the CQI degradation can be significant. However, the internal update at the transmission point can not reflect the difference, because in general the transmission point is not aware of user equipment implementations. Therefore, the internal update at the transmission point is not accurate.

FIG. 2 shows a scenario that intended user equipment reports BCI (Best Companion Precoding Matrix Index) and MU-CQI to the transmission point.

To enhance CQI accuracy for the MU transmission, currently BCI and MU-CQI are being discussed in the LTE-A standardization. To report the BCI to the transmission point, the intended user equipment firstly assumes that the potentially paired user equipment adopts a certain PMI (i.e., BCI) causing small interference to the intended user equipment. Then, the intended user equipment calculates the CQI according to the assumed BCI, which is MU-CQI. Finally, the assumed BCI and the calculated MU-CQI are reported to the transmission point in addition to SU PMI and CQI.

Although the assumed BCI and the calculated MU-CQI help MU operation at the transmission point, but it still needs to be updated at the transmission point, otherwise the throughput performance of the paired user equipment will be severely degraded.

FIGS. 3(a) and (b) shows a scenario that the actual transmission and the assumed transmission are not matched. As shown in FIGS. 3(a) and 3(b), the assumed BCI1 at the intended user equipment (UE1) for possibly paired user equipment (UE2) as shown in FIG. 3(a) does not match the actual PMI2 used for the paired user equipment (UE2) as shown in FIG. 3(b).

SUMMARY OF THE DISCLOSURE

The present disclosure is made to address the above issues.

According to one aspect of the present disclosure, there is provided a method of feeding back channel quality indicator (MU-CQI) to a transmission point in a communication system including a transmission point and a plurality of user equipments, the method comprising steps: the transmission point sending a message to an intended user equipment of the plurality of user equipments; and the intended user equipment calculating the MU-CQI based on the message, and feeding back the MU-CQI to the transmission point.

According to another aspect of the present disclosure, there is provided a user equipment for feeding back channel quality indicator (MU-CQI) to a transmission point in a communication system including a transmission point and a plurality of user equipments, the user equipment comprising: a receiving unit which receives a message from the transmission point; a processing unit which calculates the MU-CQI based on the message; and a transmitting unit which reports the MU-CQI to the transmission point.

According to a further aspect of the present disclosure, there is provided a transmission point device for receiving channel quality indicator (MU-CQI) from user equipment in a communication system, the transmission point device comprising: a transmitting unit which transmits a message to an intended user equipment; and receiving unit which receives the MU-CQI from the intended user equipment, wherein the MU-CQI is calculated based on the message.

The present disclosure enables dynamic MU operation, and improves link adaptation performance with marginal downlink overhead. And the accuracy is not limited by codebook size.

BRIEF DESCRIPTION OF DRAWINGS

These and/or other aspects and advantages of the present disclosure will become more distinct and more easier to be understood in a detailed description of the embodiments of the present disclosure in combination with attached drawings, in which.

DESCRIPTION OF THE EMBODIMENTS

Figure 1:
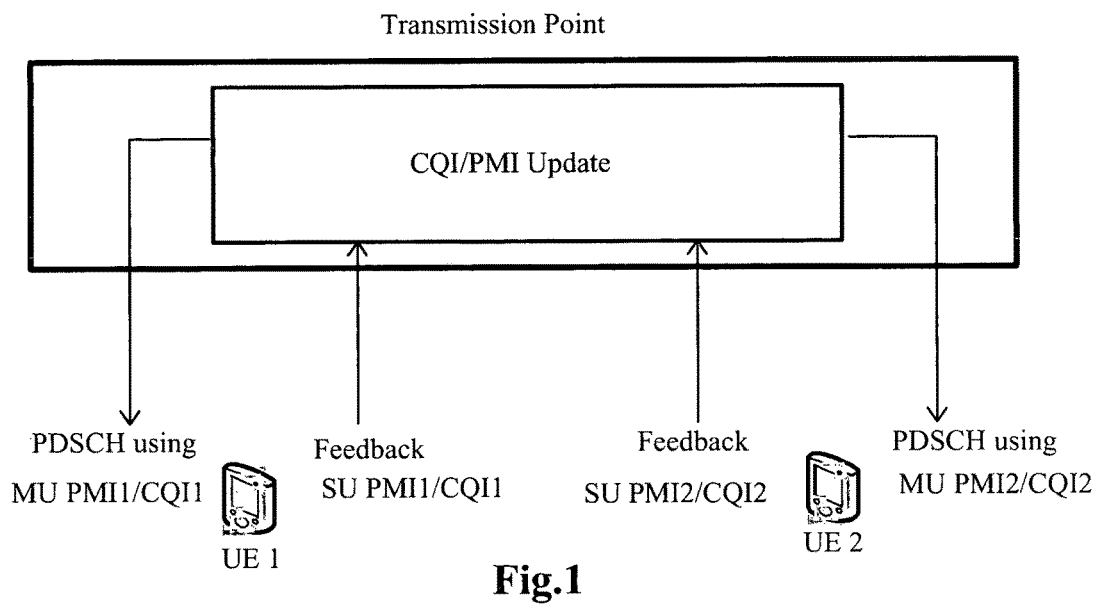
FIG. 1 shows a scenario that a transmission point updates CQI and PMI of SU-MIMO for MU-MIMO operation.
Figure 2:
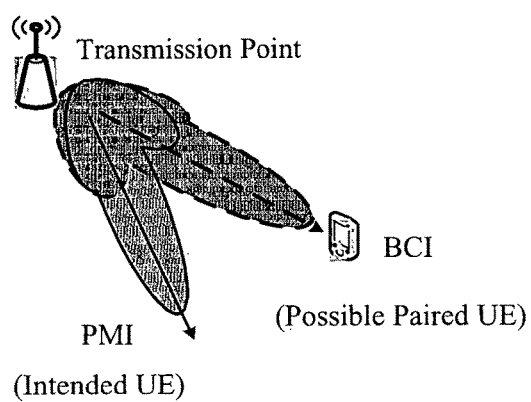
FIG. 2 shows a scenario that intended user equipment reports BCI and MU-CQI to the transmission point.
Figure 3:
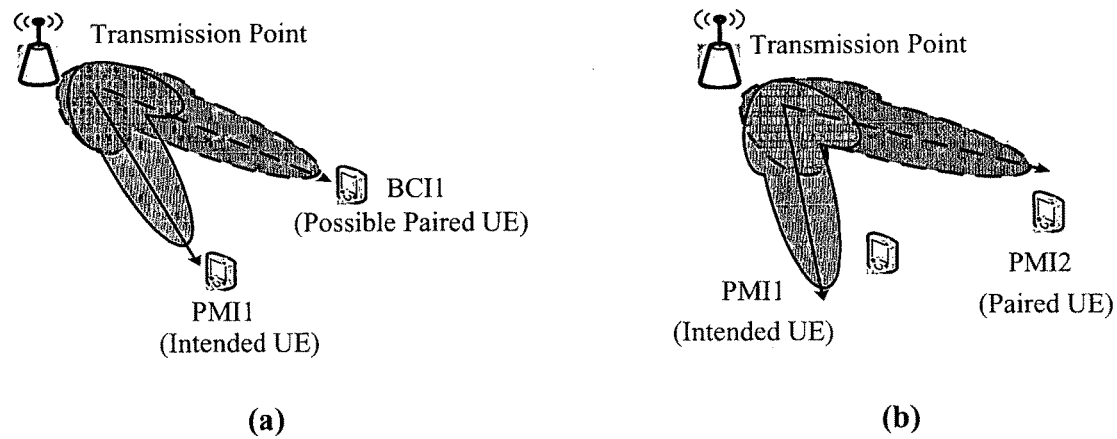
FIGS. 3(a) and (b) shows a scenario that the actual transmission and the assumed transmission are not matched.

In the following, some specific embodiments of the present disclosure will be described in details with reference to the attached drawings. If the detailed description of some related prior art may confuse the main points of the disclosure, the detailed description thereof will not be provided here. In the respective embodiments, the identical reference numerals are used to denote elements or units performing the same functions.

(First Embodiment)

Figure 4:
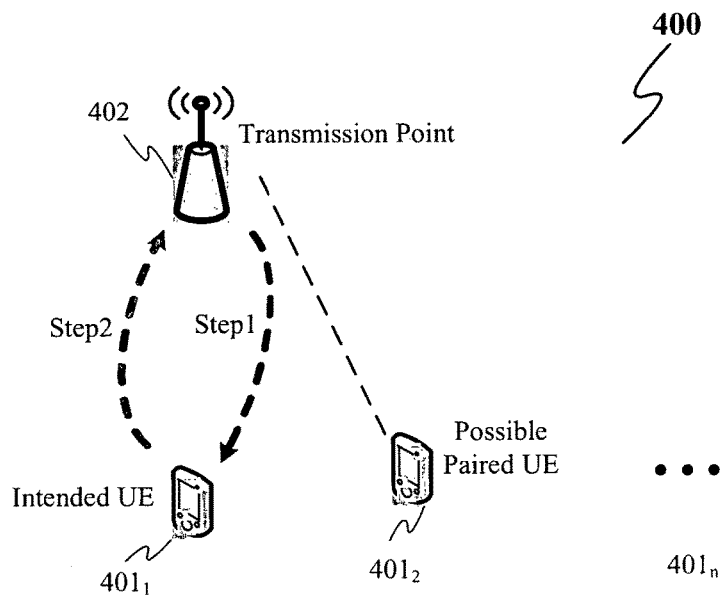
FIG. 4 shows a communication system applying the present disclosure, which provides a proposed procedure to resolve the mismatch between the actual transmission and the assumed transmission at the transmission point.

FIG. 4 shows a communication system applying the present disclosure, which provides a proposed procedure to resolve the mismatch between the actual transmission and the assumed transmission at the transmission point.

As shown in FIG. 4, the communication system 400 according to the present disclosure includes a plurality of user equipments $401_1$, $401_2$, . . . , and $401_n$, and at least one transmission point 402. As an example, there are shown only two user equipments $401_1$ and $401_2$ in FIG. 4, and the user equipment $401_1$ is taken as the intended user equipment (UE1), the user equipment $401_2$ is taken as the possibly paired user equipment (UE2).

In the communication system 400 according to the present disclosure, the transmission point 402 firstly sends a message to the user equipment $401_1$(step 1), the user equipment $401_1$ calculates the associated MU-CQI based on the message, and feeds back the MU-CQI to the transmission point 402 (step 2). Here, the message may include the intended BCI to be used by the user equipment $401_2$ which is possibly paired with the user equipment $401_1$.

According to the above example, the actual PMI associated with the paired user equipment $401_2$, that is the BCI from the perspective of the intended user equipment $401_1$, is signaled from the transmission point 402 to the intended user equipment $401_1$, and the intended user equipment $401_1$ calculates the MU-CQI based on the BCI informed from the transmission point 402, so it is possible not to update the MU-CQI at the transmission point side for the MU operation purpose.

It is noted that the factor that really impacts the MU-CQI calculation is not the BCI, but rather the BCI multiplied with downlink channel matrix. It is in general not applicable to explicitly signal the BCI multiplied with downlink channel matrix to the intended user equipment, because the channel matrix is not known at the transmission point.

As another example of the first embodiment of the present disclosure, the intended user equipment $401_1$ can measure downlink channel to obtain the downlink channel matrix, and multiplies measured downlink channel matrix with the BCI sent from the transmission point 402 to obtain the interference to the intended user equipment. Then, the intended user equipment $401_1$ calculates the MU-CQI based on the interference. Specifically, the intended user equipment $401_1$ can calculate the MU-CQI based on the following equation:

$$SNR = \frac{S}{I+N},$$

where S represents signals, N represents noises, I, which represents the interference, and I can be calculated based on the knowledge of HW, where H represents the downlink channel matrix, and $\vec{W}$ represents the BCI.

The first embodiment of the present disclosure does not need the CQI to be updated at the transmission point side, and the CQI for MU-MIMO is accurate.

(Second Embodiment)

Figure 5:
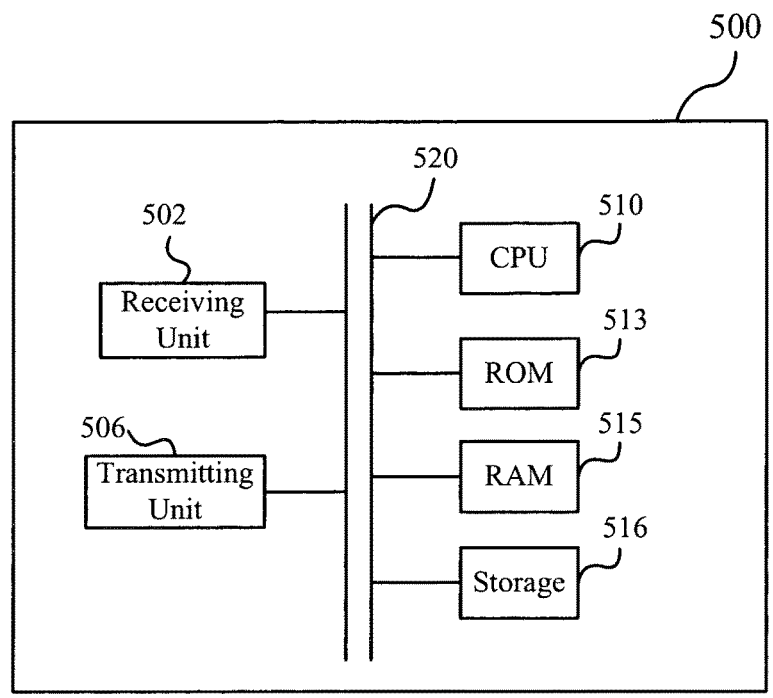
FIG. 5 shows a block diagram of a transmission point according to the present disclosure.

FIG. 5 shows a block diagram of a transmission point according to the present disclosure.

As shown in FIG. 5, a transmission point 500, which may be taken as the transmission point 402 as shown in FIG. 4, according to the present disclosure includes a receiving unit 502 and a transmitting unit 506 connected with each other.

The transmission point 500 according to the present disclosure may further include: a Center Processing Unit (CPU) 510 for executing related programs to process various data and to control operations of respective units of the transmission point 500; a Read Only Memory (ROM) 513 for storing various programs required for the CPU 510 to perform various process and control; a Random Access Memory (RAM) 515 for storing intermediate data temporarily produced by the CPU 510 in the procedure of process and control; a storage unit 516 for storing various data. The above receiving unit 502, transmitting unit 506, CPU 510, ROM 513, RAM 515, storage unit 516, etc may be connected via a data and/or command bus 520, and transfer signals between one another.

The respective units as described above do not limit the scope of the present disclosure. According to one embodiment of the present disclosure, the function of either of the receiving unit 502 and the transmitting unit 506 may also be realized by functional software in combination with the above CPU 510, ROM 513, RAM 515, storage unit 516 and the like. And, the functions of the receiving unit 502 and the transmitting unit 506 may also be realized by combining into one unit.

According to the second embodiment of the present disclosure, the transmitting unit 506 sends a message to the intended user equipment $401_1$, and intended the user equipment $401_1$ calculates the MU-CQI based on the message, and feeds back the MU-CQI to the transmission point 402. The receiving unit 502 of the transmission point 402 receives the MU-CQI from the intended the user equipment $401_1$. Here, the message may include the BCI to be used by the user equipment $401_2$ which is possibly paired with the intended user equipment $401_1$.

According to the above example, the actual PMI associated with the paired user equipment $401_2$, that is the BCI from the perspective of the intended user equipment $401_1$, is signaled from the transmission point 402 to the intended user equipment $401_1$, and the intended user equipment $401_1$ calculates the MU-CQI based on the BCI informed from the transmission point 402, so it is possible not to update CQI at the transmission point 402 for the MU operation purpose.

As another example of the second embodiment of the present disclosure, the intended user equipment $401_1$ can measure downlink channel to obtain the downlink channel matrix, and multiplies measured downlink channel matrix with the BCI sent from the transmitting unit 506 of the transmission point 402 to obtain the interference to the intended user equipment $401_1$. Then, the intended user equipment $401_1$ calculates the MU-CQI based on the interference. Specifically, the intended user equipment $401_1$ can calculate the MU-CQI based on the following equation:

$$SNR = \frac{S}{I+N},$$

where S represents signals, N represents noises, I, which represents the interference, can be calculated based on the knowledge of HW, where H represents the downlink channel matrix, and $\vec{W}$ represents the BCI.

The second embodiment of the present disclosure does not need the CQI to be updated at the transmission point side, and the CQI for MU-MIMO is accurate.

(Third Embodiment)

Figure 6:
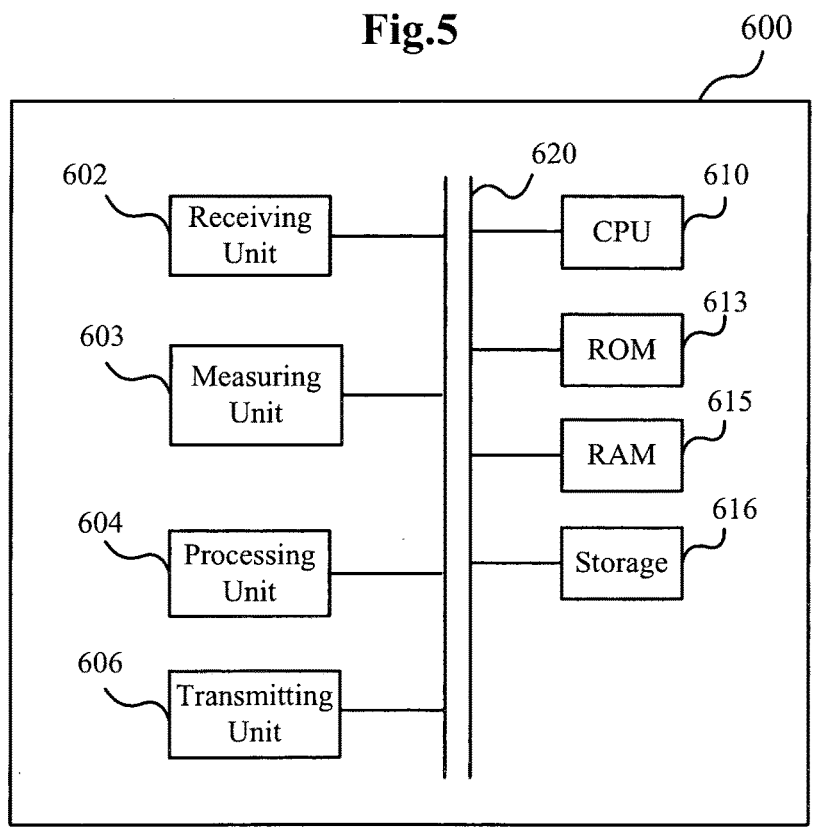
FIG. 6 shows a block diagram of a user equipment according to the present disclosure.

FIG. 6 shows a block diagram of a user equipment according to the present disclosure.

As shown in FIG. 6, the user equipment 600, which may be taken as the user equipment 401 as shown in FIG. 4, according to the present disclosure includes a receiving unit 602, a measuring unit 603, a processing unit 604, and a transmitting unit 606 connected with each other.

The user equipment 600 according to the present disclosure may further include: a Center Processing Unit (CPU) 610 for executing related programs to process various data and to control operations of respective units of the user equipment 600; a Read Only Memory (ROM) 613 for storing various programs required for the CPU 610 to perform various process and control; a Random Access Memory (RAM) 615 for storing intermediate data temporarily produced by the CPU 610 in the procedure of process and control; a storage unit 616 for storing various data. The above receiving unit 602, measuring unit 603, processing unit 604, transmitting unit 606, CPU 610, ROM 613, RAM 615, storage unit 616, etc may be connected via a data and/or command bus 620, and transfer signals between one another.

The respective units as described above do not limit the scope of the present disclosure. According to one embodiment of the present disclosure, the function of either of the receiving unit 602, the measuring unit 603, the processing unit 604, and the transmitting unit 606 may also be realized by functional software in combination with the above CPU 610, ROM 613, RAM 615, storage unit 616 and the like. And, the functions of the receiving unit 602, the measuring unit 603, the processing unit 604, and the transmitting unit 606 may also be realized by combining into one unit.

According to the third embodiment of the present disclosure, the receiving unit 602 of the user equipment 401₁ receives a message sent from the transmission point 402. The processing unit 604 of the user equipment 401₁ calculates the MU-CQI based on the message. The transmitting unit 606 feeds back the MU-CQI to the transmission point 402. Here, the message may include the BCI to be used by the user equipment 401₂ which is potentially paired with the user equipment 401₁.

According to the above example, the actual PMI associated with the paired user equipment 401₂, that is the BCI from the perspective of the user equipment 401₁, is signaled from the transmission point 402 to the user equipment 401₁, and the user equipment 401₁ calculates the MU-CQI based on the BCI informed from the transmission point 402, so it is possible not to update the CQI at the transmission point side for the MU operation purpose.

As another example of the third embodiment of the present disclosure, the measuring unit 603 of the user equipment 401₁ can measure downlink channel to obtain the downlink channel matrix. The processing unit 604 multiplies the measured downlink channel matrix with the BCI sent from the transmitting unit 506 of the transmission point 402 to obtain the interference to the user equipment 401₁. Then, the processing unit 604 of the user equipment 401₁ calculates the MU-CQI based on the interference. Specifically, the processing unit 604 of the user equipment 401₁ can calculate the MU-CQI based on the following equation:

$$SNR = \frac{S}{I+N},$$

where S represents signals, N represents noises, I, which represents the interference, can be calculated based on the knowledge of HW, where H represents the downlink channel matrix, and $\vec{W}$ represents the BCI.

The third embodiment of the present disclosure does not need the CQI to be updated at the transmission point side, and the CQI for MU-MIMO is accurate.

(Fourth Embodiment)

In the above embodiments 1-3, there is described that the message such as BCI is explicitly signaled to the intended user equipment 401₁ from the transmission point 402. There are some straightforward ways to explicitly signal the BCI to the intended user equipment. For example, a codebook based BCI is signaled through either RRC (Radio Resource Control) or PDCCH (Physical Downlink Control Channel). However, RRC signaling is slow, which can not fulfill dynamic MU-MIMO operation. On the other hand, PDCCH signaling causes much signaling overhead. For both RRC and PDCCH signaling, the accuracy of BCI is limited by codebook size, while the transmission in LTE-A can be non-codebook based.

It is noted that, if the BCI is applied on the antenna array at the transmission point on a specific RE (Resource Element), the user equipment can measure the associated BCI multiplied with channel matrix at that specific RE. It is noted that the above procedure is similar to antenna virtualization used in reference signals and antenna ports design. Therefore, according to the present embodiment, it is proposed to indicate the user equipment that certain RS (Reference Signal) ports are associated with a potentially paired user equipment (undesired signal) but not the intended user equipment. It is possible to associate for example CSI-RS (Channel Status Indicator-Reference Signal) ports or DMRS (Demodulation Reference Signal) ports with the potentially paired UE.

Overall, the present embodiment discloses that the transmission point 402 may inform the intended user equipment 401₁ that a particular resource is associated with undesired signal but not the signal intended to the user equipment 401₁. For example, the message sent from the transmission point 402 to the user equipment 401₁ includes information indicating that a certain reference signal port is associated with the undesired signal. In this case, the measuring unit 603 of the intended user equipment 401₁ measures signal power on the reference signal port associated with the undesired signal as the interference to the intended user equipment 401₁, and the processing unit 604 of the intended user equipment 401₁ calculates the MU-CQI based on the interference. Such signaling can help the intended user equipment 401₁ to have a more accurate link adaptation for the case that the intended user equipment 401₁ and another user equipment 401₂ are paired, i.e., when they are scheduled to receive data on the same resources.

The information of the allocation of the resources associated with undesired signals may be explicitly signaled to the intended user equipment 401₁ by a bitmap manner. However, it is also possible to inform the intended user equipment 401₁ that the resources associated with the undesired signal are allocated according to a certain predefined pattern. For example, the resources associated with the undesired signals can be allocated to one or multiple CSI-RS ports. In that case, the transmission point 402 simply indicates the intended user equipment 401₁ of the index of the CSI-RS ports. For another example, the resources associated with the undesired signals can be allocated to one or multiple DMRS ports. In this case, the transmission point 402 indicates the intended user equipment 401₁ of the index of DMRS ports. In the release 10 of the LTE-A, the reference signal ports 7-14 are allocated as the DMRS ports, the reference signal ports 15-22 are allocated as the CSI-RS ports.

In the case of DMRS ports, according to one example of the present embodiment, if the PDSCH signal is associated with a first DMRS port, and the undesired signal is associated with a second DMRS port, the intended user equipment 401₁ measures the signal power at the first DMRS port as the signal, and measures signal power at the second DMRS port as the interference. Specifically, if the undesired signal is associated with the DMRS port 8, and the PDSCH signal is associated with the DMRS port 7, the intended user equipment 401₁ shall calculate signal power S based on the measurement on the DMRS port 7, and calculate interference I based on the measurement on the DMRS port 8, and then may calculate the MU-CQI based on the following equation:

$$SNR = \frac{S}{I+N},$$

where S represents signals, N represents noises. The transmission point 402 may apply the precoding vector of the potentially paired user equipment 401₂ on the DMRS port 8. Therefore, when the intended user equipment 401₁ predicts modulation and coding scheme, the intended user equipment 401₁ can accurately know the interference power due to the potentially paired user equipment 401₂, and improve link adaptation accuracy. In the above case of DMRS ports, according to another example of the present embodiment, the signal power S can be calculated based on the CSI-RS ports 15~18 (for feedback purpose).

In the case of CSI-RS ports, according to another example of the present embodiment, if the channel of PDSCH signal is estimated through the CSI-RS ports 15~18 (i.e., 4Tx CSI-RS ports), it is possible for the transmission point 402 to signal the intended user equipment 401₁ that the CSI-RS ports 15~18 are associated with the PDSCH transmission, the CSI-RS port 19 is associated with the undesired signal, and the CSI-RS ports 20~22 has zero transmit power. In this case, the measuring unit 603 of the intended user equipment 401₁ shall calculate interference power I based on the measurement on the CSI-RS port 19, calculate signal power S based on the measurement on CSI-RS port 15~18, and may calculate the MU-CQI based on the following equation:

$$SNR = \frac{S}{I+N},$$

where S represents signals, N represents noises. The transmission point 402 may apply the precoding vector of the potentially paired user equipment 401₂ on the CSI-RS port 19.

According to a further example of the present embodiment, if the channel of PDSCH signal is estimated through the CSI-RS ports 15~18 (i.e., 4Tx CSI-RS ports), it is possible to configure that the CSI-RS ports 15~18 in a predefined subset of subframes are associated with the PDSCH transmission, while the CSI-RS ports 15~18 (or port 15) in another subset of subframes are associated with the undesired signal, in which the subframes are a set of time and frequency resources being contiguous in the time domain. In this case, the measuring unit 603 of the intended user equipment 401₁ shall calculate interference power I based on the CSI-RS ports 15-18 (or port 15) in the second subset of subframes, and may calculate the MU-CQI based on the following equation:

$$SNR = \frac{S}{I+N},$$

where S represents signals, N represents noises. The transmission point 402 may apply the precoding vector of the potentially paired user equipment 401₂ on the CSI-RS ports 15-18 (or port 15) in the second subset of subframes.

The fourth embodiment enables dynamic MU operation, and improves link adaptation performance with marginal downlink overhead. And the accuracy is not limited by codebook size.

(Fifth Embodiment)

The above fourth embodiment has discussed the situation of the MU-MIMO operation. Moreover, the present disclosure is not only applicable to the MU-MIMO operation but also useful for cooperation between multiple transmission points. In case of the multi-point transmission, the undesired signal may be transmitted from transmission points other than the serving transmission point.

Figure 7:
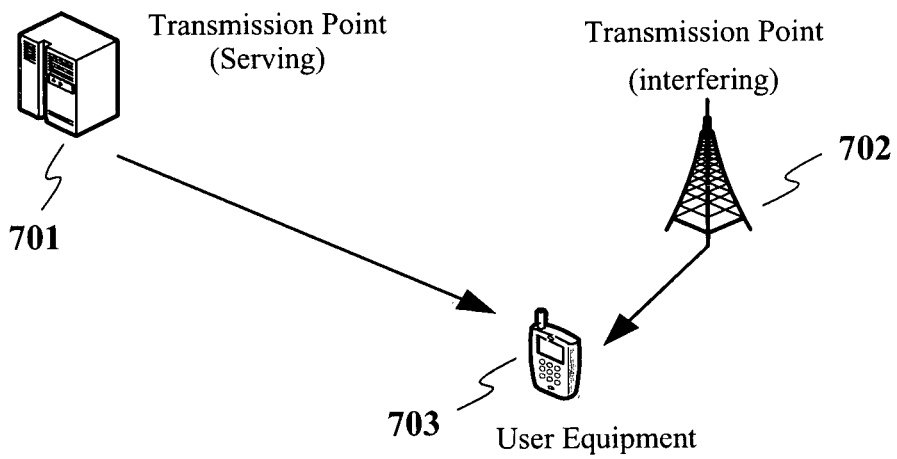
FIG. 7 shows a communication system including a plurality of transmission points according to the present disclosure.

FIG. 7 shows a communication system including a plurality of transmission points according to the present disclosure.

In FIG. 7, the communication system 700 may include a plurality of transmission points, but show only two transmission points 701 and 702. As shown in FIG. 7, the transmission point 701 is taken as a serving transmission point, and other transmission point 702 may be taken as an interfering transmission point. In the multi-point transmission case, the interference to the intended user equipment 703 is from the interfering transmission point 702 but not from the potentially paired user equipments in the serving transmission point 701. The serving transmission point 701 and the interfering transmission point 702 may have the same cell ID or different cell IDs. The serving transmission point 701 sends a signal to the intended user equipment 703, and the interfering transmission point 702 send the undesired signal (interference) to the user equipment 703. Here, the communication system 700 may include a plurality of the interfering transmission points 702. Here, the transmission points 701 and 702 may adopt the same configuration as the transmission point 500, and the user equipment 703 may adopt the same configuration as the user equipment 600.

For example, it is assumed that the interfering transmission point 702 and the serving transmission point 701 have the same cell ID, and only one reference signal port is associated with the undesired signal. If the channel of PDSCH signal is estimated through CSI-RS ports 15~18 (i.e., 4Tx CSI-RS ports), it is possible for the serving transmission point 701 to signal the intended user equipment 703 that the CSI-RS port 19 is associated with the undesired signal with respect to the intended user equipment 703. On one hand, the intended user equipment 703 would report the CQI/PMI based on the CSI-RS ports 15~18 to the serving transmission point 701. On the other hand, the signal at the CSI-RS port 19 is the undesired signal, and it is from an interfering transmission point 702. In this case, the measuring unit 603 of the intended user equipment 703 shall measure the signal power at the CSI-RS port 19 as the interference I, and the processing unit 604 of the intended user equipment 703 shall calculate the MU-CQI based on the interference I as described above. The intended user equipment 703 may additionally report the MU-CQI considering the interference power measured based on the CSI-RS port 19 to the serving transmission point 701, where the interfering transmission point 702 may apply the precoding vector of the potentially paired user equipment (not shown) on the CSI-RS port 19. That is, if the serving transmission point 701 and the interfering transmission points 702 have the same cell ID, and only one signal port is associated with the undesired signal, the intended user equipment 703 measures signal power on the one reference signal port as the interference, and calculates and reports the MU-CQI based on the interference.

For another example, it is assumed that the interfering transmission point 702 and the serving transmission point 701 have different cell IDs, and only one signal port is associated with the undesired signal. If the channel of PDSCH signal is estimated through the CSI-RS ports 15~18 (i.e., 4Tx CSI-RS ports), it is possible for the serving transmission point 701 to signal the intended user equipment 703 that the CSI-RS port 19 is associated with the undesired signal. On one hand, the intended user equipment 703 would report the CQI/PMI based on the CSI-RS ports 15~18 to the serving transmission point 701. On the other hand, the signal at the CSI-RS port 19 is the undesired signal, and it is from an interfering transmission point 702. In this case, the measuring unit 603 of the intended user equipment 703 shall measure the signal power at the CSI-RS port 19 as the interference I, and the processing unit 604 of the intended user equipment 703 shall calculate the MU-CQI based on the interference I as described above. The intended user equipment 703 may additionally report the MU-CQI considering the interference power measured based on CSI-RS port 19 to the serving transmission point 701, where the interfering transmission point 702 may apply the precoding vector of the potentially interfering user equipment (not shown) on the CSI-RS port 19. According to one example of the present embodiment, the interference is from the interfering transmission point 702 instead of other user equipments in the serving transmission point 701, and the scrambling of the CSI-RS port 19 may be based on the cell ID of the serving transmission point 701 instead of that of the interfering transmission point 702. On the other hand, the scrambling of the CSI-RS port 19 may be based on the cell ID of the interfering transmission point 702 instead of that of the serving transmission point 701. In either case, one or both of the transmission points 701 and 702 may additionally indicate the intended user equipment 703 the cell ID associated with the CSI-RS port 19 (undesired signal). In this case, the cell ID associated with the CSI-RS port 19 may be used to descramble signals on the CSI-RS port 19, at the same time the signaling of cell ID association with CSI-RS port can avoid possible double counting the interference power on the CSI-RS port 19 and CRS ports 0~3. That is, if the serving transmission point 701 and the interfering transmission point 702 have different cell IDs, and only one reference signal port is associated with the undesired signal, the serving transmission point 701 indicates the intended user equipment 703 the cell ID corresponding to the reference signal ports associated with the undesired signal, and the intended user equipment 703 measures the signal power on the one signal port as the interference, and calculates and reports the MU-CQI based on the interference.

For a further example, it is assumed that the interfering transmission point 702 and the serving transmission point 701 have the same cell ID, but at least two reference signal ports are associated with the undesired signal. If the channel of PDSCH signal is estimated through the CSI-RS ports 15~18 (i.e., 4Tx CSI-RS ports), it is possible for the serving transmission point 701 to signal the intended user equipment 703 that at least two of the CSI-RS ports 19~22 are associated with the undesired signal for the intended user equipment 703. On one hand, the intended user equipment 703 would report the CQI/PMI based on the CSI-RS ports 15~18 to the serving transmission point 701. On the other hand, the signals at the at least two of the CSI-RS ports 19~22 are the undesired signals, and they are from the interfering transmission points 702. In this case, the measuring unit 603 of the intended user equipment 703 shall estimate the BCI to be used by the potentially paired user equipment (not shown) that causes least interference based on the at least two of the CSI-RS ports 19~22, the processing unit 604 of the intended user equipment 703 shall calculate the MU-CQI based on the BCI, and the transmitting unit 606 of the intended user equipment 703 additionally report the BCI and the MU-CQI degradation due to the least interference to the serving transmission point 701. That is, if the serving transmission point 701 and the interfering transmission points 702 have the same cell ID, and two or more reference signal ports are associated with the undesired signals, the measuring unit 603 of the intended user equipment 703 estimates the BCI to cause lease interference to the intended user equipment 703, the processing unit 604 of the intended user equipment 703 calculates the MU-CQI based on the BCI, and the transmitting unit 606 of the intended user equipment 703 additionally reports the BCI and the MU-CQI to the serving transmission point.

For a yet further example, it is assumed that the interfering transmission point 702 and the serving transmission point 701 have different cell IDs, but at least two signal ports are associated with the undesired signal. If the channel of PDSCH signal is estimated through the CSI-RS ports 15~18 (i.e., 4Tx CSI-RS ports), it is possible for the serving transmission point 701 to signal the intended user equipment 703 that at lease two of the CSI-RS ports 19~22 are associated with the undesired signal. On one hand, the intended user equipment 703 would report the CQI/PMI based on the CSI-RS ports 15~18 to the serving transmission point 701. On the other hand, the signal at the at least two of the CSI-RS ports 19~22 are the undesired signals, and they are from the interfering transmission points 702. In this case, the measuring unit 603 of the intended user equipment 703 shall estimate the BCI to be used by the potentially paired user equipment (not shown) that causes least interference based on the at least two of the CSI-RS ports 19~22, the processing unit 604 of the intended user equipment 703 shall calculate the MU-CQI based on the BCI, and the transmitting unit 606 of the intended user equipment 703 shall additionally report the BCI that causes least interference and the MU-CQI degradation due to the least interference to the serving transmission point 701.

According to one example of the present embodiment, the interference is from the interfering transmission point 702 instead of other user equipments in the serving transmission point 701, but the scrambling of the at least two of the CSI-RS ports 19~22 may be based on the cell ID of the serving transmission point 701 instead of that of the interfering transmission point 702. On the other hand, the scrambling of the at least two of the CSI-RS ports 19~22 may be based on the cell ID of the interfering transmission point 702 instead of that of serving transmission point 701. In either case, one or both of the transmission points 701 and 702 may additionally indicate the intended user equipment 703 the cell IDs associated with the CSI-RS ports 19~22 (undesired signals). In this case, the cell IDs associated with the at least two of the CSI-RS ports 19~22 may be used to descramble the signals on the at least two of the CSI-RS ports 19~22, at the same time it may avoid double counting the interference power on the at least two of the CSI-RS ports 19~22. That is, if the serving transmission point 701 and the interfering transmission points 702 have different cell IDs, and two or more signal ports are associated with the undesired signals, the intended user equipment 703 estimates the BCI to cause lease interference based on the at least two of the CSI-RS ports 19~22, calculates the MU-CQI based on the BCI, additionally reports the BCI and the MU-CQI to the serving transmission point 701, and either of the transmission points 701 and 702 may indicate the intended user equipment 703 the cell ID associated with the undesired signals.

For the multiple ports associated with the undesired signal, there are two cases:

Case 1: all ports are associated with one interfering transmission point. For example, the CSI-RS ports 19~22 are transmitted from one interfering transmission point, and the scrambling of the CSI-RS ports 19~22 is according to either the cell ID of the serving transmission point or the cell ID of the interfering transmission point. In this case, the intended user equipment additionally reports the BCI that causes least interference based on the CSI-RS ports 19~22, and additionally report the MU-CQI degradation due to the interference. The transmission point may additionally indicate the intended user equipment the cell ID associated with the CSI-RS ports 19~22 to avoid double counting the interference power.

Case 2: the ports 19~22 are associated with multiple interfering transmission points, respectively. Specifically, the CSI-RS ports 19~22 are transmitted from the multiple interfering transmission points, respectively, and the scrambling of the CSI-RS ports 19~22 is according to either the cell ID of the serving transmission point or the cell ID of one of the interfering transmission point(s). In this case, the intended user equipment measures signal power on each of the CSI-RS ports 19~22 as the interferences, calculates MU-CQIs based on each of the interferences, and reports MU-CQI degradation due to the interference from each of the multiple interfering transmission points. As another example, the intended user equipment may measure overall signal power on all the CSI-RS ports 19~22 as the interference, calculates the MU-CQI based on the overall interference, and reports the MU-CQI degradation due to the interference from all the multiple interfering transmission points to the serving transmission point. The transmission point may additionally indicate user equipment the cell ID associated with the CSI-RS ports 19~22 to avoid double counting the interference power.

The present disclosure enables dynamic MU operation, and improves link adaptation performance with marginal downlink overhead. And the accuracy is not limited by codebook size.

(Sixth Embodiment)

Figure 8:
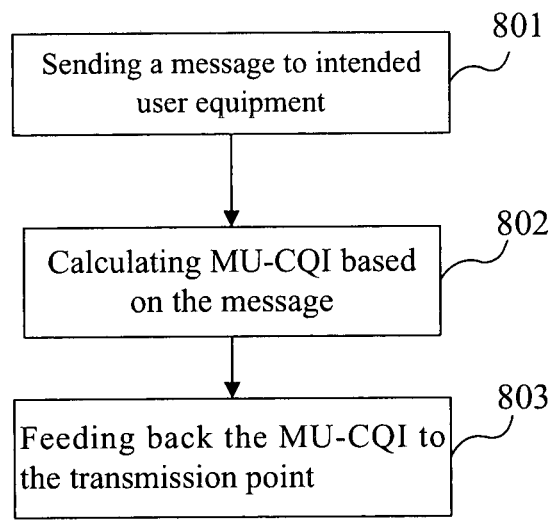
FIG. 8 is a flow chart showing a method of feeding back MU-CQI to a transmission point in a communication system according to the present disclosure.

FIG. 8 is a flow chart showing a method of feeding back MU-CQI to a transmission point in a communication system according to the present disclosure.

As shown in FIG. 8, the method of feeding back channel quality indicator (MU-CQI) to a transmission point in a communication system including the transmission point and a plurality of user equipments comprising steps 801~803. In the step 801, the transmission point sending a message to an intended user equipment of the plurality of user equipments. In the step 802, the intended user equipment calculating the MU-CQI based on the message. In the step 803, the intended user equipment feeding back the MU-CQI to the transmission point.

In the above method, the message may include precoding matrix index (BCI) to be used by another user equipment of the plurality of user equipments which is potentially paired with the intended user equipment.

In the above method, it further comprises steps: the intended user equipment measures downlink channel, and multiplies the measured downlink channel with the BCI sent from the transmission point to obtain interference to the intended user equipment; and the intended user equipment calculates the MU-CQI based on the interference.

In the above method, the intended user equipment calculates the MU-CQI based on the equation:

$$SNR = \frac{S}{I+N},$$

wherein S represents signals, N represents noises, I, which represents the interference, can be calculated based on the knowledge of H$\vec{W}$, where H represents the downlink channel matrix, and $\vec{W}$ represents the BCI.

In the above method, the message may include information indicating that at least one signal port is associated with undesired signal.

In the above method, the intended user equipment measures signal power on the at least one signal port as the interference to the intended user equipment, and calculates the MU-CQI based on the interference.

In the above method, the signal ports 7-14 are allocated as DMRS ports, the signal ports 15-22 are allocated as CSI-RS ports.

In the above method, the communication system includes a plurality of transmission points composed of a serving transmission point and at least one interfering transmission points, in which the undesired signal is from the at least one interfering transmission points.

In the above method, the serving transmission point and the at least one interfering transmission point have the same cell ID or different cell IDs.

In the above method, if one reference signal port is associated with the undesired signal, the intended user equipment measures signal power on the one signal port as the interference, calculates and reports the MU-CQI based on the interference.

In the above method, if two or more signal ports are associated with the undesired signal, and transmitted from one interfering transmission point, the intended user equipment estimates the BCI to cause lease interference to the intended user equipment, calculates the MU-CQI based on the BCI, and additionally reports the BCI and the MU-CQI to the serving transmission point.

In the above method, if two or more signal ports are associated with the undesired signal, and transmitted from different interfering transmission points respectively, the intended user equipment measures signal power on each of the signal ports as the interferences, calculates and reports the MU-CQI based on each of the interferences.

In the above method, if two or more signal ports are associated with the undesired signal, and transmitted from different interfering transmission points respectively, the intended user equipment measures overall signal power on all signal ports as the interference, calculates and reports the MU-CQI based on the interference.

In the above method, if the serving transmission point and interfering transmission points have different cell IDs, the serving transmission point further indicates the intended user equipment the cell ID associated with the undesired signal.

The respective steps of the method according to the present disclosure may be performed by each of the receiving unit 602, measuring unit 603, processing unit 604, and transmitting unit 606 of the user equipment 600, and/or each of the receiving unit 502 and transmitting unit 505 of the transmission point device 500.

The present disclosure enables dynamic MU operation, and improves link adaptation performance with marginal downlink overhead. And the accuracy is not limited by codebook size.

The above embodiments of the present disclosure are only exemplary description, and their specific structures and operations do not limit the scope of the disclosure. Those skilled in the art can combine different parts and operations in the above respective embodiments to produce new implementations which equally accord with the concept of the present disclosure.

The embodiments of the present disclosure may be implemented by hardware, software and firmware or in a combination thereof, and the way of implementation thereof does not limit the scope of the present disclosure.

The connection relationships between respective functional elements (units) in the embodiments of the present disclosure do not limit the scope of the present disclosure, in which one or multiple functional element(s) or unit(s) may contain or be connected to any other functional elements.

Although several embodiments of the present disclosure has been shown and described in combination with attached drawings as above, those skilled in the art should understand that variations and modifications which still fall into the scope of claims and their equivalents of the present disclosure can be made to the embodiments without departing from the principle and spirit of the disclosure.

What is claimed is:

1. A user equipment in a communication system including a first transmission point, a second transmission point, and the user equipment, the user equipment comprising:
   a receiver, which, in operation, receives a message from the first transmission point, the message indicating that Channel Status Indicator-Reference Signal (CSI-RS) antenna ports in a first subset of subframes, to which a precoding vector of another user equipment is applied, are associated with a first signal that is intended for the another user equipment and is transmitted from the second transmission point, while the CSI-RS antenna ports in a second subset of subframes are associated with a second signal that is intended for the user equipment and is transmitted from the first transmission point, wherein the message indicates the CSI-RS antenna ports in the first subset of subframes are associated with an ID of the second transmission point that is different from an ID of the first transmission point;
   circuitry, which, in operation, measures an interference using the first signal, and calculates a Channel Quality Indicator (CQI) based on the measured interference; and
   a transmitter, which, in operation, transmits the CQI to the first transmission point.

2. The user equipment according to claim 1, wherein the message includes a Precoding Matrix Index (PMI) that is used in the another user equipment.

3. The user equipment according to claim 1, wherein the first transmission point is a serving transmission point and the second transmission points is an interfering transmission point.

4. The user equipment according to claim 1, wherein the message indicates the first subset of subframes in a bitmap.

5. The user equipment according to claim 1, wherein the message indicates the first subset of subframes according to a defined pattern.

6. The user equipment according to claim 1, wherein the message indicates that a transmission power of at least one of the CSI-RS ports in the first subset of subframes is zero.

7. A method for transmitting a CQI from a user equipment in a communication system including a first transmission point, a second transmission point, and the user equipment, the method comprising:
   receiving, by the user equipment, a message from the first transmission point, the message indicating that Channel Status Indicator-Reference Signal (CSI-RS) antenna ports in a first subset of subframes, to which a precodinq vector of another user equipment is applied, are associated with a first signal that is intended for the another user equipment and is transmitted from the second transmission point, while the CSI-RS antenna ports in a second subset of subframes are associated with a second signal that is intended for the user equipment and is transmitted from the first transmission point, wherein the message indicates the CSI-RS antenna ports in the first subset of subframes are associated with an ID of the second transmission point that is different from an ID of the first transmission point;
   measuring, by the user equipment, an interference using the first signal
   calculating, by the user equipment, a Channel Quality Indicator (CQI) based on the measured interference; and
   transmitting, by the user equipment, the CQI to the first transmission point.

8. The method according to claim 7, wherein the message includes a Precoding Matrix Index (PMI) that is used in the another user equipment.

9. The method according to claim 7, wherein the first transmission point is a serving transmission point and the second transmission point is an interfering transmission point.

10. The method according to claim 7, wherein the message indicates the first subset of subframes in a bitmap.

11. The method according to claim 7, wherein the message indicates the first subset of subframes according to a defined pattern.

12. The method according to claim 7, wherein the message indicates that a transmission power of at least one of the CSI-RS ports in the first subset of subframes is zero.

* * * * *